(12) United States Patent
Tizon et al.

(10) Patent No.: US 7,704,471 B2
(45) Date of Patent: Apr. 27, 2010

(54) BAYER PROCESS FOR PRODUCTION OF ALUMINA TRIHYDRATE BY ALKALINE DIGESTION OF BAUXITE, THE PROCESS COMPRISING A PREDESILICATION STEP

(75) Inventors: Eric Tizon, Aix en Provence (FR); Clotilde Fryns, Aix en Provence (FR)

(73) Assignee: Aluminium Pechiney (FR)

( * ) Notice: Subject to any disclaimer, the term of this patent is extended or adjusted under 35 U.S.C. 154(b) by 406 days.

(21) Appl. No.: 11/569,290

(22) PCT Filed: May 11, 2005

(86) PCT No.: PCT/FR2005/001177

§ 371 (c)(1), (2), (4) Date: Nov. 17, 2006

(87) PCT Pub. No.: WO2005/123591

PCT Pub. Date: Dec. 29, 2005

(65) Prior Publication Data

US 2007/0178041 A1    Aug. 2, 2007

(30) Foreign Application Priority Data

May 18, 2004    (FR) .................................. 04 05405

(51) Int. Cl.
*C01F 7/00* (2006.01)
(52) U.S. Cl. ...................... 423/121; 423/625
(58) Field of Classification Search ................. 423/121, 423/625

See application file for complete search history.

(56) References Cited

U.S. PATENT DOCUMENTS

| 3,413,087 A | 11/1968 | Roberts |
| 3,481,705 A | 12/1969 | Peck et al. |
| 3,853,535 A | 12/1974 | Szabo Nee Mogyorosi et al. |
| 4,289,629 A | 9/1981 | Andrew |
| 4,426,363 A | 1/1984 | Yamada et al. |
| 4,430,310 A | 2/1984 | Malito et al. |
| 4,650,653 A | 3/1987 | Lepetit et al. |
| 5,653,947 A | 8/1997 | Lamerant |
| 6,296,818 B2 * | 10/2001 | Lamerant .................... 423/121 |

FOREIGN PATENT DOCUMENTS

| AU | 474596 B | 7/1974 |
| WO | 98/22390 A | 5/1998 |

* cited by examiner

*Primary Examiner*—Steven Bos
(74) *Attorney, Agent, or Firm*—Banner & Witcoff, Ltd.

(57) ABSTRACT

A Bayer process comprises grinding and then digestion of bauxite by bringing it into contact with a sodium aluminate liquor. Digestion consists of forming a slurry that is then treated to separate insoluble residues from the sodium aluminate liquor. The liquor is then crystallized and recycled back to green liquor after having been separated from the alumina trihydrate precipitated during crystallization. The process comprises a predesilication treatment during which the ground bauxite, before digestion, is brought into contact with an aqueous sodic solution that has a content of carbonates, sulphates and possibly chlorides which, expressed as a percentage related to the caustic concentration, has less than half of the corresponding impurities content of the spent liquor. Preferably, the pure caustic soda used to compensate for caustic soda losses in the Bayer circuit, previously injected just after evaporation, is now added in the aqueous sodic solution for the predesilication treatment.

5 Claims, 4 Drawing Sheets

BAYER PROCESS FOR PRODUCTION OF ALUMINA TRIHYDRATE BY ALKALINE DIGESTION OF BAUXITE, THE PROCESS COMPRISING A PREDESILICATION STEP

CROSS REFERENCE TO RELATED APPLICATIONS

This application claims the benefit of priority of the filing date of Patent Cooperation Treaty patent application, Serial Number PCT/FR2005/001177, filed on May 11, 2005, which is incorporated herein by reference, wherein Patent Cooperation Treaty patent application Serial Number PCT/FR2005/001177 was not published under PCT Article 21(2) in English, and also claims the benefit of priority of the filing date of French patent application, Application No. FR 0405405, filed on May 18, 2004, which is incorporated herein by reference.

FIELD OF THE INVENTION

The invention relates to a process for the production of alumina trihydrate by alkaline digestion of bauxite using the Bayer process, comprising grinding and then digestion of the ground bauxite by bringing it into contact with a sodium aluminate liquor (green liquor), the digestion consisting of forming a slurry that is treated to separate insoluble residues from the sodium aluminate liquor, the aluminate liquor thus obtained then being crystallized and recycled back to green liquor after being separated from the alumina trihydrate precipitated during the crystallization. More particularly, the invention relates to a process for reducing the content of silica dissolved in the aluminate liquor circulating in the Bayer circuit.

BACKGROUND

The content of silica dissolved in the aluminate liquor must be controlled to prevent scaling of pipes in the Bayer circuit and to control the purity of the trihydrate produced. The vigilance necessary for this control varies depending on the nature of the treated bauxite. Paradoxically, this control is most difficult for bauxites with a low content of reactive silica.

A first type of desilication is carried out on the entire liquor itself. For example, it is carried out immediately after digestion with a sufficiently long residence time for the quantity of dissolved silica to reach a critical supersaturation threshold, which triggers the desilication reaction by precipitation of siliceous compounds and leads to a drop in the concentration of silica in the liquor to an acceptable level, just before separation of the insoluble residues. It can also be carried out before digestion, by locally introducing precipitation germs: for example, in the process described by U.S. Pat. No. 6,086,834 (ALCAN), in which the liquor must pass through a bed composed of a mix of sand and sodalite, or in the process described in French application No. 03 11909 (ALUMINIUM PECHINEY) in which a calcium based compound (typically comprising hydrogarnets) is introduced into the aluminate liquor upstream of the heat exchangers.

A second type of desilication is called "predesilication" because the ground bauxite is brought into contact with an alkaline solution before digestion. U.S. Pat. No. 3,481,705, AU Patent No. 0 474 596 and U.S. Pat. No. 4,426,363 describe a predesilication treatment, where the alkaline solution may be a sodium hydroxide solution, optionally mixed with sodium carbonate, a potassium hydroxide solution or, preferably, a Bayer aluminate liquor. Using the latter is preferred because it is not expensive: a small part of the Bayer spent liquor is drawn off and conducted to the wet grinding of the bauxite. The thick slurry resulting from wet grinding is maintained in a tank typically a few hours before digestion. The silica contained in the bauxite is dissolved in this liquor aliquot, which quickly reaches a supersaturation threshold from which the precipitation of desilication products (DSP) occurs. The DSP are then eliminated with the insoluble residues of bauxite digestion. Predesilication also acts directly on bauxite components added into the Bayer circuit, but unlike the first type of treatments, it cannot be used efficiently to reduce the silica content of the liquor quickly at a precise location of the Bayer circuit. For this reason, both types of desilication treatments are generally combined on the same Bayer process.

This invention relates to an improvement to the predesilication treatment. The predesilication treatment may be considered as being a preventive treatment carried out on the bauxite that is introduced into the Bayer circuit. However, this type of treatment can only be efficient if it prevents the liquor from reaching a given critical concentration threshold of dissolved silica before crystallization—typically a silica/caustic soda ratio of about 0.7% for factories with a caustic soda concentration of about 155 g/l (note in the following that such ratios are referenced to the weight of caustic soda "% ctq", or in fact "% $SiO_2$ ctq")—so that in particular the purity of the trihydrate produced can be controlled.

It is found that predesilication treatments recommended by different documents according to prior art are often apparently efficient, but cannot always achieve a sufficiently low content of dissolved silica in the liquor.

A perfect predesilication would consist of transforming all soluble siliceous phases of bauxite (for example kaolinite) into the most stable possible phase (DSP) under digestion conditions. In this way, the concentration of silica in the liquor at the output from digestion would be less than or equivalent to the DSP solubility concentration (solubility between 0.5 and 0.9% ctq depending on digestion conditions). However, in the article "Effect of Predesilication and Digestion Conditions on Silica Level in Bayer Liquor"—Light Metals 2004 TMS, 2004, the authors (E. TIZON, Ph. CLERIN, B. CRISTOL) demonstrated that the supposedly insoluble phases (DSP) created during predesilication are not all stable under digestion conditions, particularly for residence times typically used in the industry (6 to 10 h), and that their dissolution during the digestion may finally participate in the increase in the content of silica dissolved in the liquor. Thus, under some conditions, in predesilication as it is carried out in the prior art, the silica content dissolved in the aluminate liquor downstream of digestion cannot be efficiently controlled.

It has also been demonstrated that solubility of DSP increases greatly when the concentration of alumina increases. Thus, this loss of efficiency of predesilication may in particular lead to production losses during digestion (the alumina concentration is limited by the silica concentration).

SUMMARY OF THE INVENTION

Therefore, in order to increase the efficiency of predesilication, the applicant looked for a process to reduce the solubility of the DSP formed while enabling maximum transformation of soluble siliceous phases into DSP.

A first purpose of the invention is to provide a process for production of alumina trihydrate by alkaline digestion of bauxite using the Bayer process, comprising grinding and then digestion of the ground bauxite by bringing it into contact with a sodium aluminate liquor (green liquor), the digestion consisting of forming a slurry that is then treated to separate insoluble residues of sodium aluminate liquor, the aluminate liquor thus obtained then being crystallized and recycled back to the green liquor after having been separated from the alumina trihydrate precipitated during the crystallization step (and generally concentrated by evaporation), the Bayer process comprising a predesilication treatment during which the ground bauxite is brought into contact with an aqueous sodic solution before digestion, wherein the aqueous sodic solution that is used for the predesilication treatment is at least partially drawn off from the Bayer line and is treated in such a manner that it has a caustic concentration of between 60 g $Na_2O$/liter and 220 g $Na_2O$/liter and a weight content of carbonates and sulphates or sulphites, which, when expressed as a percentage related to the caustic concentration, is less than half the corresponding impurities weight content of the spent liquor.

FIGURES

DETAILED DESCRIPTION OF EMBODIMENTS OF THE INVENTION

Figure 1:
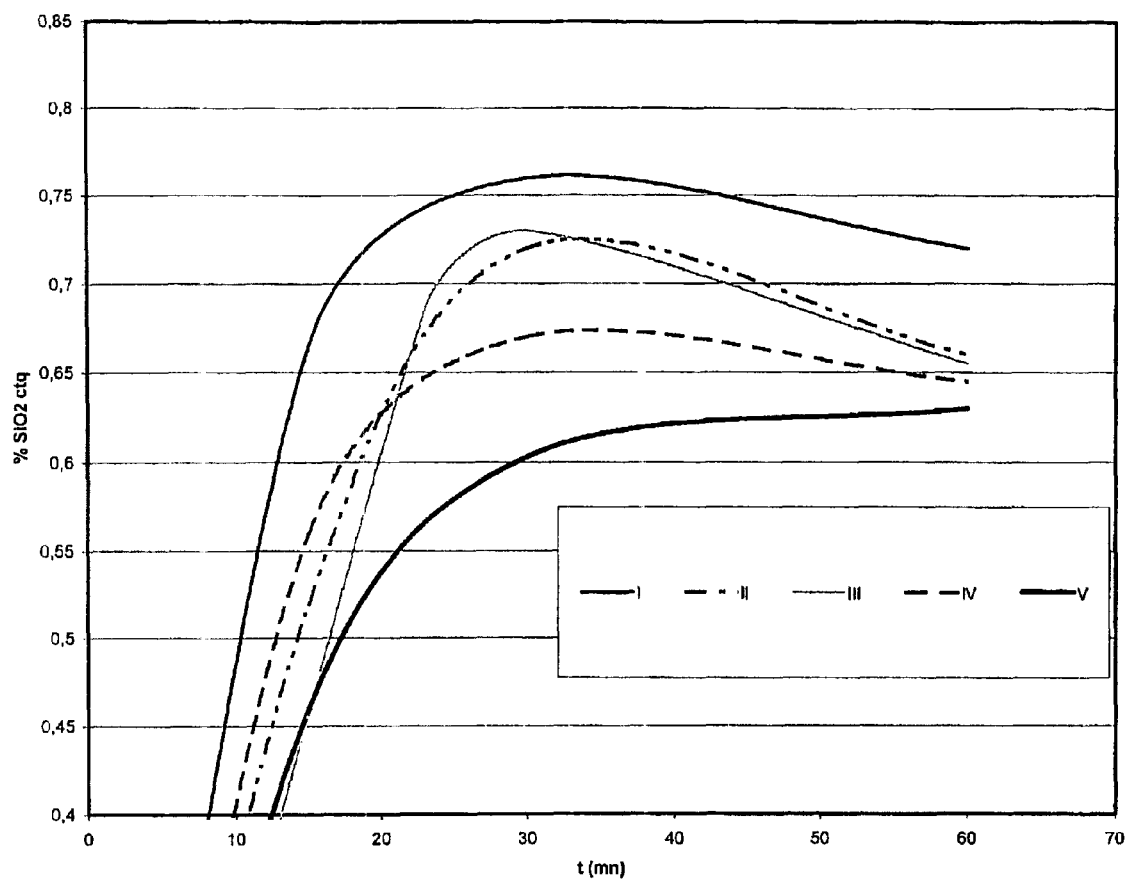
FIG. 1 illustrates the dissolution rates of silica during digestion with sodalites synthesized under different predesilication conditions, namely using an aqueous sodic solution containing more or less impurities.

The weight content of carbonates and sulphites or sulphates is expressed independently of the associated cations. For example, the content of carbonates can be expressed in terms of the weight of $CO_3$ per unit volume. We will denote this percentage as "% $CO_3$ ctq" when it is expressed as a percentage related to the equivalent caustic concentration, itself expressed as the weight of $Na_2O$ per unit volume. Similarly, the content of sulphites or sulphates can be expressed in terms of the weight of the $SO_3$ per unit volume. We will denote this percentage as "% $SO_3$ ctq" when it is expressed as a percentage related to the equivalent caustic concentration. Concentrations of carbonate and sulphate or sulphite impurities in Bayer liquors depend on the nature of the digested bauxites, and for this reason we cannot define critical concentrations of impurities by absolute values. The important thing here is to avoid the presence of these impurities, or at least to significantly reduce their quantity, in the step in the Bayer circuit at which they could be most harmful. Typically, for a Bayer circuit with a spent liquor containing 12% $CO_3$ ctq and 2% $SO_3$ ctq, the concentration of carbonates in the aqueous sodic solution used for predesilication must be less than 6% $CO_3$ ctq, and the corresponding concentration in sulphates or sulphites must be less than 1% $SO_3$ ctq.

By carefully observing the many precipitated products appearing during a predesilication treatment, the applicant surprisingly observed that among the DSPs obtained, not all compounds belonging to the sodalite family are as stable as suggested in the specialized literature. In particular, he observed that sodalites are more stable in digestion if they contain fewer carbonate, sulphate or sulphite type ions, and more aluminate ions.

The sodalites formed are represented by the following general formula:

$$Na_2O \cdot 2SiO_2 \cdot Al_2O_3 \cdot \tfrac{1}{3}(Na_2Y)$$

where Y represents $CO_3^{2-}$, $SO_4^{2-}$ or $SO_3^{2-}$, or $2Cl^-$ or $2Al(OH)_4^-$ One mole of silica corresponds to one sixth of a mole of $Na_2Y$, which behaves like a "cage" trapping one carbonate, sulphate or sulphite ion, or two chloride or aluminate ions.

The applicant observed that the stability of sodalites during digestion could depend strongly of the nature of the ions originating from the aqueous solution used for treatment of predesilication and trapped by $Na_2Y$ cages. Sodalites including aluminate ions are the most stable. Sodalites containing carbonate ions and/or sulphate or sulphite ions are the least stable. To a lesser extent, chloride ions also have a negative influence on the stability of sodalite during digestion.

One preferred embodiment of the invention consists of using an aqueous sodic solution for predesilication for which the chloride weight content is also less than a half of the chloride weight content of the spent liquor. The chloride weight content may be expressed in terms of weight of Cl per unit volume. We will denote this percentage as "% Cl ctq" when it is expressed as a percentage related to the equivalent caustic concentration. Typically, for a Bayer circuit with spent liquor containing 4% Cl ctq, the chloride weight content in the aqueous sodic solution used for predesilication must be less than 2% Cl ctq.

The Bayer aluminate liquor has an almost identical content of impurities (% $SO_3$ ctq, % $CO_3$ ctq or % Cl ctq) regardless of the point at which it has been drawn off (before digestion, after digestion or after dilution). Variations of these contents over time may be due to a change in the bauxite quality (the main entry of impurities in the cycle) or to a modification of soluble caustic soda losses (the main cause of impurity losses in the cycle). Weekly monitoring is often sufficient to record a change in these impurity contents, which vary only slightly with time in any one given factory.

Until now, the aqueous sodic solution used for predesilication was traditionally an aliquot of the spent aluminate liquor. According to the present invention, the aqueous sodic solution is at least partially drawn off from the Bayer line and is treated in such a manner that it contains less impurities, such as sulphites and/or sulphates, carbonates and optionally chlorides, than the aluminate liquor that flows through the Bayer line. It may be an aliquot of spent liquor that should be purified in order to contain fewer impurities. It may also be a Bayer effluent that has a lower caustic concentration, typically a washer overflow, which should be treated, for example by adding sodium hydroxide in order to have a caustic concentration between 60 g $Na_2O$/liter and 220 g $Na_2O$/liter.

If the aqueous sodic solution used for the predesilication is an aliquot of the pregnant liquor, most or all of its impurities, typically carbonate, sulphate or sulphite ions, are eliminated using a specific purification treatment such as membrane filtration or precipitation.

The aqueous sodic solution used for the predesilication may also result from a mix of a pure aqueous sodium hydroxide solution with aluminate liquor drawn off at a point in the Bayer circuit at which it has the lowest possible impurities content. The aqueous sodium hydroxide solution can be obtained by diluting trade sodium hydroxide (hereinafter also called "pure caustic soda" or "new caustic soda") in water that has controlled impurities content. Ideally, this water may be derived from condensates derived from evaporation of water in the evaporation or digestion steps; it may also be hot water output from purging plant boilers or raw water. This aluminate liquor, typically the caustification settling tank overflow or the first washer overflow, or any other washer overflow from hydrate washer series, has a caustic soda concentration of 30 to 60 g/l. The impurity level expressed as % ctq is identical for most of these liquors, but they have the advantage that they also have a lower concentration of caustic soda (typically 30-70 g/l instead of 160-180 g/l) than the spent liquor, so that the global quantity of impurities input in predesilication can be limited. The caustification settling tank overflow also has the advantage that its carbonates content is lower than the carbonates content in the rest of the circuit (between 4 and 8% $CO_3$ ctq).

Several of these liquors (pure caustic soda diluted in controlled raw water, sodic liquor with few impurities, spent liquor, etc.) can also be mixed.

In practice, the aqueous sodic solution used for the predesilication treatment is often used also for wet grinding of bauxite: a first aliquot is drawn off for grinding the bauxite and the second aliquot is added to the resulting wet ground bauxite so as to obtain a slurry with a high solid content, typically between 300 g/l and 1500 g/l. If the solution used during wet grinding is different from the solution added during predesilication, both will be chosen according to the invention such that their mix (mixing is carried out at the beginning of the predesilication step) has a content, expressed as a proportion related to the caustic concentration, in carbonates, sulphites or sulphates and possibly chlorides, which is less than half the corresponding impurities content of the spent liquor.

Typically, the predesilication treatment consists of putting the ground bauxite and an aqueous sodic solution with a caustic concentration of between 60 g $Na_2O$/l and 220 g $Na_2O$/l, and preferably between 60 g $Na_2O$/l and 180 g $Na_2O$/l, in contact before digestion. A minimum caustic content at the end of predesilication equal to between 60 g $Na_2O$/l and 140 g $Na_2O$/l, depending on the digested bauxite, is recommended to obtain the most stable possible sodalite (the stability of sodalite no longer depends on the caustic content above this value). The slurry resulting from the mix of ground bauxite and aqueous sodic solution is maintained for less than 24 hours, typically between 1 and 24 hours, preferably between 5 and 24 hours, at a temperature between 80° C. and 150° C. Preferably, the quantity of aqueous sodic solution is adjusted such that the solid content in the slurry is between 800 and 1500 g/l. For high solid contents, an additive such as the DREWO® additive can be added to reduce the viscosity of the slurry.

More particularly, in the case in which the aqueous sodic solution results from a mix with an aliquot of Bayer liquor, the highest possible solid content (within the limit of viscosity and minimum caustic content constraints) is desirable to limit the introduction of impurities in the predesilication step.

In one preferred embodiment of the invention, the aqueous solution used for the predesilication treatment is obtained by dissolution of pure commercially available caustic soda in water (sodic water or not) with a sufficiently low content of carbonates and sulphates or sulphites, and possibly chlorides, so that the recommended final contents for the invention are respected.

At the present time, a quantity of sodium hydroxide (pure commercially available caustic soda) is added such that it compensates for caustic soda losses (caustic soda contained in discarded insoluble residues, caustic soda contained in the alumina hydrate produced and caustic soda contained in the liquid outputs from the Bayer circuit). This sodium hydroxide is traditionally added directly or indirectly into the aluminate liquor at the output from evaporation. Indirect introduction of sodium hydroxide may for example consist of using the liquor from declogging of precipitators or some filters (for example a safety filter). Deposits are formed on the walls of the precipitators, some filters clog during time and they need to be disassembled regularly to be cleaned. In the case where a pure aqueous solution of sodium hydroxide is used to remove the deposited hydrate crusts, the liquor resulting from the treatment, which is enriched in dissolved alumina, can be poured into the aluminate liquor. Therefore, sodium hydrate is frequently poured into the aluminate liquor after concentration by evaporation immediately or after the declogging treatment, and according to this embodiment of the invention it is used directly for predesilication instead of pouring it into the aluminate liquor after evaporation.

If sodium hydroxide is used firstly to clean precipitators or some filters, the new process is slightly less efficient since dissolution of the crust causes contamination of soda by impurities present in the crust impregnation liquor. Furthermore for some bauxites, it may be useful to use a predesilication liquor with the lowest possible content of dissolved alumina as a proportion of the caustic concentration (see ratio Rp defined in Example 1) so as to increase the dissolution of gibbsite during this predesilication step, which facilitates access of the aluminate liquor to the kaolin and the transformation of the latter into DSP (see the end of Example 2). Dissolution of crusts increases Rp, and therefore it can have a negative effect with regard to a process in which pure caustic soda is injected directly, but it is still better than a conventional process.

According to the invention, sodium hydroxide as described above can be used for predesilication and, therefore, the previous injection point which was downstream of evaporation is moved upstream of the predesilication treatment. The quantity of pure caustic soda necessary for desilication of the bauxite must correspond to the caustic soda quantity necessary to compensate for caustic soda losses in the Bayer circuit. Unfortunately, this is generally not the case with simple digestion at atmospheric pressure, or medium or high pressure, because the caustic soda quantity necessary to compensate for losses is significantly lower than the quantity corresponding to the flow of aqueous sodic solution used for predesilication. However, this preferred embodiment of the invention may advantageously be applicable at least in the following three cases:

Case 1: Digestion with Sweetening

During a high-pressure digestion including sweetening, it is usually possible to carry out the predesilication on the bauxite added for the sweetening entirely with pure caustic soda. Sweetening is a process (for example described in European patent EP 0 960 069 (ALUMINIUM PECHINEY)) that relates particularly to alkaline digestion according to the Bayer process for bauxites that have a significant alumina monohydrate (boehmite or diaspore) content. In this process, supersaturation of the liquor in alumina is increased by adding alumina trihydrate bauxite (gibbsite), which is wet ground and then introduced into the slurry exiting from the high temperature digestion of the bauxite containing alumina monohydrate. Within the context of this invention, the liquor aliquot used for wet grinding and predesilication of gibbsite bauxite is replaced by an aqueous solution of sodium hydroxide obtained by dissolution of commercially available pure caustic soda in water with a sufficiently low content of carbonates and sulphates or sulphites, and possibly chlorides.

In other words, this Bayer process includes a digestion step with sweetening in which the entire amount of pure caustic soda—that is normally introduced into the circuit in order to compensate for caustic soda losses—is also used to supply the aqueous solution for the predesilication treatment of the sweetening bauxite, the spent liquor being essentially redirected after evaporation directly to the main digestion.

Application of the invention to digestion with sweetening is particularly attractive. This process provides a means of reaching particularly high caustic soda and alumina concentrations at the output from digestion, which then tend to result in a "stable" DSP (sodalite) with solubility higher than the acceptable silica level at the output from digestion. By reducing impurities that might "pollute" the resulting sodalite, the result is a much more stable DSP at the output from digestion and therefore a much lower silica content in the liquor.

Case 2: Setting Up a New Digestion Unit in an Existing Installation

When a new digestion unit is installed, particularly for high productivity digestions (high soda and alumina concentrations leading to high silica contents) in an existing plant, the entire predesilication of the new digestion line can be carried out using new caustic soda or the declogging liquor of the plant, i.e. of the entire installation.

Case 3: Temporary Application in an Old Installation

This process may be used occasionally (typically one week) in an existing plant, for a standard process (one digestion type only) or a more complex process (sweetening or secondary digestion in parallel to a main digestion). This occasional use can temporarily reduce the silica level of the liquor, in prevention or as a means of solving a silica precipitation crisis during crystallization or severe scaling in heat exchangers or during evaporation.

EXAMPLES

Example 1

Dissolution Rates (FIG. 1)

Different sodalites were synthesized for 24 hours under predesilication conditions chosen so as to evaluate the effect of the presence of impurities in the aqueous sodic solution.

The impurity contents of the different sodic solutions used are as follows:

| I | 13% $CO_3$ ctq | 4% $SO_3$ ctq | 4% Cl ctq |
| II | 13% $CO_3$ ctq | 0% $SO_3$ ctq | 0% Cl ctq |
| III | 0% $CO_3$ ctq | 4% $SO_3$ ctq | 0% Cl ctq |
| IV | 0% $CO_3$ ctq | 0% $SO_3$ ctq | 4% Cl ctq |
| V | 0% $CO_3$ ctq | 0% $SO_3$ ctq | 0% Cl ctq |

These sodalites were then digested in a liquor containing alumina under the following digestion conditions:

Temperature: 145° C.

Aluminate liquor:

caustic concentration: 200 g $Na_2O$/l alumina supersaturation:

$$Rp = \frac{\text{dissolved } Al_2O_3 \text{ content (g/l)}}{\text{dissolved caustic } Na_2O \text{ content (g/l)}} = 1.29$$

content of impurities: 12% $CO_3$ ctq, 4% $SO_3$ ctq, 4% Cl ctq

As shown in FIG. 1, digestion of these sodalites results in solution rate curves (content of dissolved silica in proportion to the content of caustic soda dissolved in the liquor as a function of time), which all have the same shape regardless of the initial sodalite: passage through a maximum content (due to the time scale chosen, the maximum observed on the V curve is not completely reached in FIG. 1) followed by a slow decrease of the silica level with time.

The highest silica levels are obtained with synthesized sodalite with maximum impurities (I), while sodalite with no impurities (V) is the most stable during digestion.

Example 2

Figure 2:
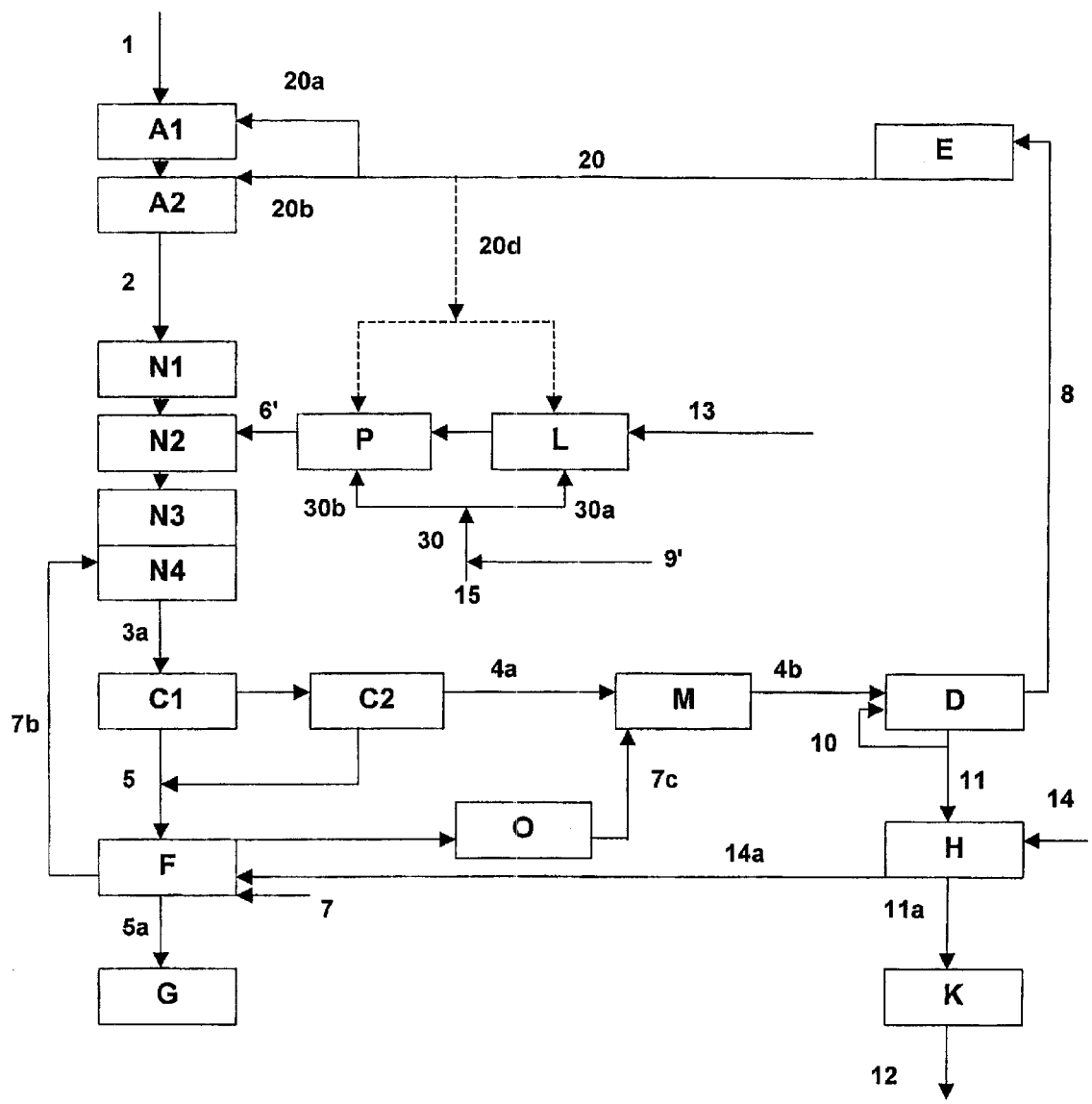
FIG. 2 shows a diagram of the steps of a particular embodiment of the process according to the invention, used within the context of improved digestion with sweetening described in EP 0 960 069.
Figure 3:
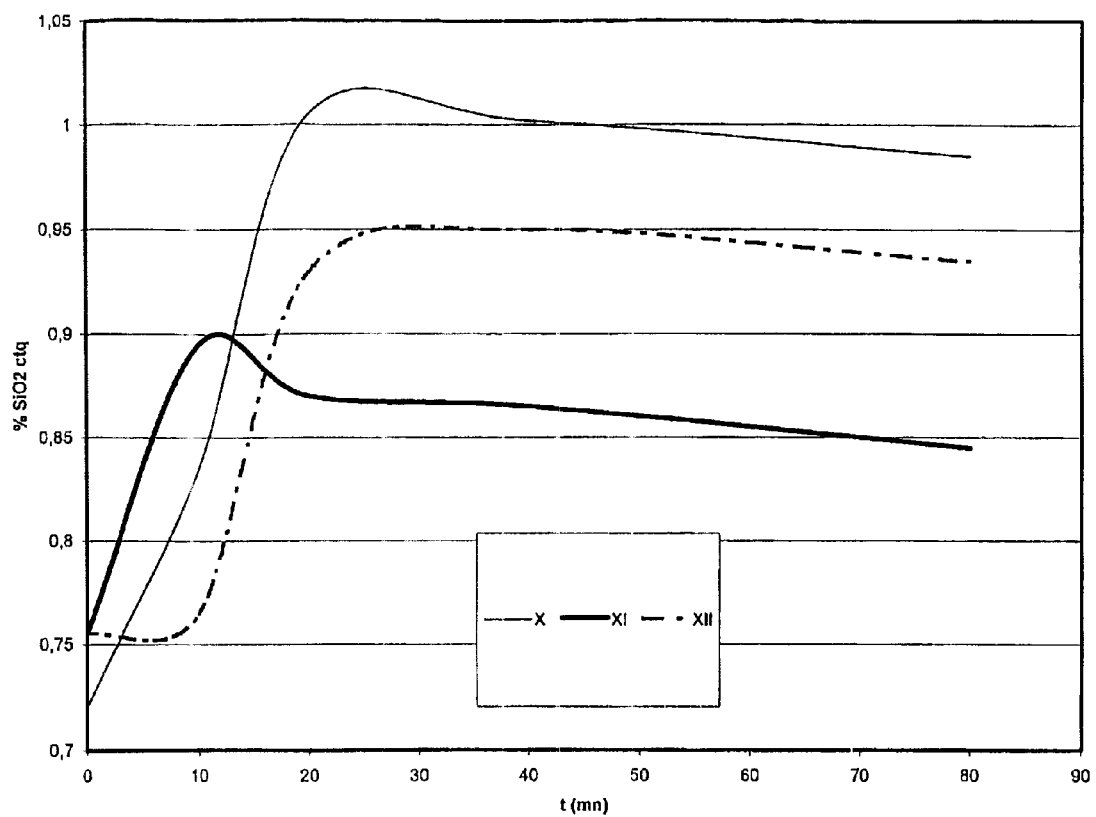
FIG. 3 illustrates three silica dissolution rates during digestion with sweetening as shown in FIG. 2, each of these curves relating to the use of a particular aqueous sodic solution intended for predesilication of gibbsite.

Digestion of Monohydrate Bauxite with Sweetening (FIGS. 2 and 3)

This example illustrates an improvement to the digestion process with sweetening described in European patent EP 0 960 069.

A monohydrate bauxite 1, after a first wet grinding A1 in the presence of an aliquot 20*a* of a green liquor 20, for which the Rp is preferably between 0.55 and 0.65 and the caustic concentration is between 160 and 220 g $Na_2O$/l, is introduced with another aliquot 20*b* of the green liquor 20 into digesters to form a slurry that is heated to a temperature between 220 and 300° C. for a sufficiently long time to solubilize the alumina monohydrate, typically between 0.2 and 1.0 hours. The slurry 2 output from this first pressurized digestion A2, for which the alumina supersaturation is characterized by an Rp value between 1.05 and 1.20, is partially cooled while its pressure is released (Cooling/Flash N1). A pulp 6' resulting from wet grinding L of a trihydrate bauxite 13 is injected under pressure ("Sweetening" N2) at a temperature of less than 200° C. Before being injected into the slurry 2, the ground pulp 6' is held at 100° C. for 8 hours, so as to cause predesilication P of the pulp.

In patent EP 0 960 069, the wet grinding and predesilication took place with a third aliquot (labelled 20c in EP 0 960 069) of the green liquor. According to the invention, this added aliquot is completely or partially eliminated (the case in which it is partially eliminated is shown in FIG. 2 illustrating an aliquot 20*d* in dashed lines) and is replaced by the addition of an aqueous sodic solution 30 that is a pure aqueous solution of sodium hydroxide 9' diluted with water 15, with a controlled content of impurities. This water may be replaced by an aluminate liquor drawn off at a point in the Bayer circuit at which it has the lowest possible content of impurities, typically caustification settler tank overflow. In this case, the addition is made in two steps: a first aliquot 30*a* of the aqueous sodic solution 30 is used in wet grinding of trihydrate bauxite 13 and the second aliquot 30*b* is poured into the slurry resulting from wet grinding, with a quantity adjusted to reach a solid content of 1000 g/l.

The injection is preferably made between 190° C. and 130° C. in the flash tank corresponding to this temperature, which gives a residence time of at least two minutes. The slurry 3*a*, enriched in alumina due to the injection of ground pulp 6', is then cooled and its pressure is reduced to atmospheric pressure N3. Its Rp is then between 1.20 and 1.40 and its caustic concentration is between 180 and 240 g Na2O/l. It is subjected to a first dilution N4 with regard to a fraction 7b of diluted liquor from red mud washer tank series. Its concentration is reduced to a value between 160 and 175 g Na2O/l. It is then subjected to a temperature slightly lower than the boiling temperature (but less than 5° C. lower), to settlement C1 in the presence of a flocculating agent, and finally filtration C2 to separate the sodium aluminate liquor 4a from insoluble residues 5. After backwashing F with raw water 7 and water 14a from the washing of the alumina trihydrate 11 produced, these inert residues 5a, also called red mud, are disposed of in the tip G.

The aluminate liquor 4a is diluted (dilution M) with filtered washing water 7c (filtration O) from residues 5. The diluted solution 4b has a caustic concentration of between 140 and 155 g Na2O/l. It is then cooled and crystallised (D) between 80° C. and 50° C., in the presence of recycled precipitate fine particles 10 used as seed. The alumina trihydrate particles thus obtained are sorted such that the largest 11 are recovered for washing H in water 14 and calcination K of the washed particles 11a in order to supply production alumina 12, while the finest particles remain within the recycled seed 10. The spent liquor 8 is then concentrated by evaporation E. Once concentrated, the liquor is used as green liquor 20.

Typically, the orders of magnitude of the flows concerned are the following:
the slurry 2 (output from digestion of monohydrate bauxite) circulates in the installation at 650-1500 m³/h,
the flow of the slurry 6' associated with sweetening is on the order of 30 to 80 m³/h,
while the pure aqueous solution of sodium hydroxide is added into water 15 at a rate of between 5 and 10 m³/h.

No more caustic soda is added after evaporation E, reference 9 in FIG. 2 of EP 0 969 096. This addition is made in wet grinding L of the gibbsite bauxite 13 and the predesilication P with the addition of caustic soda 9'. The quantity of pure caustic soda necessary to desilicate the bauxite is the same as the soda quantity necessary to compensate for soda losses in the Bayer circuit.

FIG. 3 illustrates three curves representing the dissolution rates of silica during digestion with sweetening for a bauxite with diaspore, each of these curves being related to the use of a different sodic solution during predesilication with sweetening. In this type of digestion, the caustic concentration is high (close to 220 g $Na_2O$/l) and the critical concentration threshold of dissolved silica that should preferably not be exceeded in the liquor at the output from digestion is on the order of 0.85% $SiO_2$ ctq-0.90% $SiO_2$ ctq in this case.

Curve reference (X) plots the dissolution rate of silica in the liquor when predesilication has been carried out with an aliquot of spent liquor. After passing through a very high maximum content (1.02% $SiO_2$ ctq), the content slowly decreases, remaining significantly above the critical threshold.

Curve reference (XI) plots the dissolution rate of silica in the liquor when predesilication has been carried out using a pure aqueous solution of sodium hydroxide diluted with raw water. After passing through a maximum content of 0.90% $SiO_2$ ctq, the content decreases, passing below this critical threshold.

Curve reference (XII) plots the silica dissolution rate in the liquor when predesilication has been carried out using an aqueous solution of sodium hydroxide containing impurities with a concentration identical to the concentration of the spent liquor. The difference with the spent liquor is essentially due to the lack of dissolved alumina (Rp=0). After passing through a maximum content of 0.96% $SiO_2$ ctq, the content slowly decreases while remaining fairly high (0.94% $SiO_2$ ctq) after 80 minutes. This final curve, which gives intermediate results, is useful for quantifying the corresponding effects of the content of alumina dissolved in the sodic solution and the content of impurities in this same sodic solution. The effect of a zero Rp can thus be estimated at about ⅓ of the total gain resulting from replacement of the spent liquor by pure caustic soda in predesilication. With a zero Rp, a larger quantity of alumina is solubilized during predesilication, thus facilitating access of the liquor to the kaolin and the transformation of the latter to sodalite.

Example 3

Figure 4:
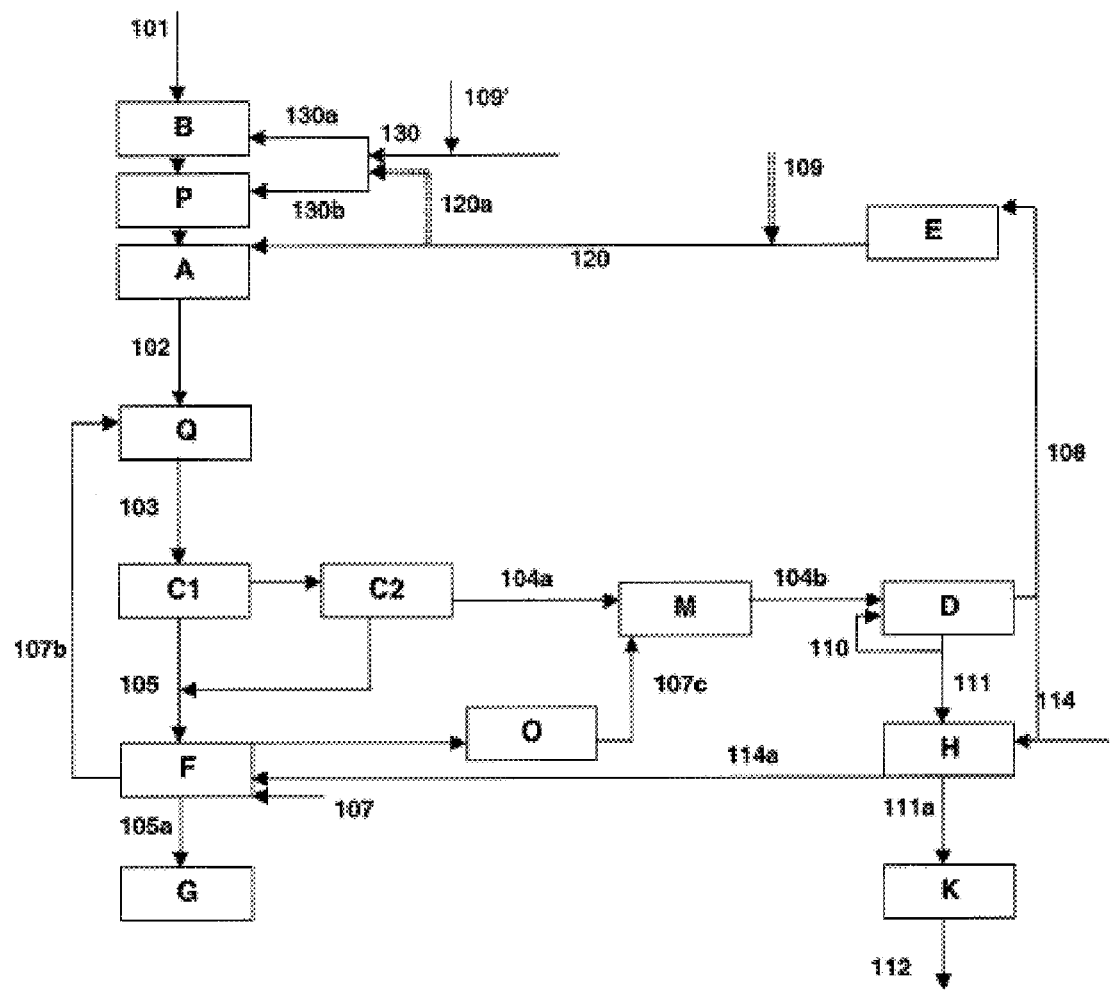
FIG. 4 shows a diagram of the steps of a particular embodiment of the process according to the invention, temporarily used within the context of a "conventional" Bayer process.

Temporary Use in an Old Installation (FIG. 4)

The Bayer process in this example will be used to treat an alumina trihydrate bauxite (gibbsite).

A gibbsite bauxite 101 is subjected to wet grinding B in the presence of a sodic solution that is usually an aliquot 120a of the green liquor 120. The ground bauxite is subjected to a predesilication treatment P (typically 8 hours at 100° C.), usually using an aliquot of the green liquor 120. The slurry 102 output from the digestion A is subjected to postdesilication Q and then dilution by adding a fraction 107b of the diluted liquor returning from the red mud washer tank series. The resulting slurry 103 is then settled C1 in the presence of a flocculating agent and finally filtered C2 to separate the sodium aluminate liquor 104a from insoluble residues 105. After backwashing F with raw water 107 and water 114a from washer tank series of the produced alumina trihydrate 111, these inert residues 105a are disposed of in the tip G.

The aluminate liquor 104a is diluted (dilution M) with filtered washing water 107c (filtration O) of the residues 105. The caustic concentration of the diluted solution 104b is between 140 and 155 g Na2O/l. It is then cooled and crystallised (D) between 80° C. and 50° C., in the presence of recycled precipitate fines 10 used as seed. The alumina trihydrate particles thus obtained are sorted such that the largest 111 are recovered for washing H in water 114 and calcination K of the washed particles 111a in order to supply production alumina 112, while the finest particles remain within the recycled seed 110. The spent liquor 108 is then concentrated by evaporation E. Once concentrated, the liquor is used as green liquor 120.

Caustic soda losses are compensated under "normal" conditions by regular addition of caustic soda after evaporation E (arrow in dashed lines referenced 109). When the content of the silica dissolved in the liquor reaches a dangerous threshold beyond which there is a risk of a silica precipitation crisis during crystallization or unwanted scaling in the heat exchangers or during evaporation, or if this situation has already occurred so that it is necessary to reduce the silica content without decreasing the ratio Rp at output from digestion (such a decrease would cause a loss of productivity), the supply of sodic solution from wet grinding B and from predesilication P can be modified by moving the position at which pure caustic soda is added from the evaporation exit. This addition is then made at wet grinding step B of the gibbsite bauxite 101 and predesilication P with the addition of caustic soda 109'. Since the quantity of pure caustic soda necessary to desilicate the bauxite is significantly greater than the quantity of caustic soda necessary to compensate for caustic soda losses in the Bayer circuit, this addition can only be temporary. The addition in this case is made in two steps: a first aliquot 130a of the aqueous sodic solution 130 is used in wet grinding of bauxite and the second aliquot 130$b$ is poured into the slurry resulting from wet grinding, with a quantity adjusted to reach a solid content of 1000 g/l.

The order of magnitude of the flows concerned is as follows:

- the slurry 102 circulates in the installation at a rate of 650-1500 m$^3$/h,
- the pure aqueous solution of sodium hydroxide 109 used in "normal" conditions is at a flow of between about 5 and 10 m$^3$/h,
- the flow of pure aqueous solution of sodium hydroxide 109' used in an isolated manner for predesilication is between about 40 and 80 m$^3$/h.

The invention claimed is:

1. A process for the production of alumina trihydrate by alkaline digestion of bauxite using the Bayer process, comprising: (a) grinding bauxite, (b) predesilication of the ground bauxite by bringing the ground bauxite into contact with an aqueous sodic solution, (c) digestion of the ground bauxite after predesilication by bringing it into contact with a sodium aluminate liquor, wherein the digestion comprises forming a slurry that includes the ground bauxite, the aqueous sodic solution and the sodium aluminate liquor and treating the slurry to separate insoluble residues from the sodium aluminate liquor, and wherein the resulting portion of the slurry without insoluble residues is defined as a "pregnant liquor", (d) crystallizing the pregnant liquor whereby alumina trihydrate is precipitated and wherein the sodium aluminate liquor without the precipitated alumina trihydrate is defined as a "spent liquor", wherein the aqueous sodic solution that is used for the predesilication originates from a mixture of an aqueous sodium hydroxide solution with a Bayer aluminate liquor, the aqueous sodium hydroxide solution resulting from dilution of new caustic soda in water, wherein the aqueous sodic solution is treated in such a manner that it has a caustic concentration of between 60 g Na$_2$O/liter and 220 g Na$_2$O/liter and a weight content of carbonates, sulphates or sulphites, which, expressed as a percentage of the caustic concentration, is less than half a corresponding impurities weight content of the spent liquor.

2. The process according to claim 1, wherein aqueous sodic solution has a chloride weight content which, expressed as a percentage of the caustic concentration, is less than half a chloride weight content of the spent liquor.

3. The process according to claim 1, wherein the predesilication is carried out using a spent liquor aliquot from which most or all of its impurities have been eliminated.

4. The process according to claim 1, wherein the new caustic soda is the caustic soda that is added to compensate for caustic soda losses in a Bayer line.

5. The process according to claim 1, wherein the aqueous sodic solution contains a declogging liquor injected is at an injection point for supplying the aqueous sodic solution that will be used for the predesilication.

* * * * *